(12) United States Patent
Egi

(10) Patent No.: US 11,106,184 B2
(45) Date of Patent: Aug. 31, 2021

(54) CONTROL SYSTEM

(71) Applicant: OMRON Corporation, Kyoto (JP)

(72) Inventor: Mamoru Egi, Otsu (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/644,554

(22) PCT Filed: Dec. 12, 2018

(86) PCT No.: PCT/JP2018/045693
§ 371 (c)(1),
(2) Date: Mar. 5, 2020

(87) PCT Pub. No.: WO2019/117201
PCT Pub. Date: Jun. 20, 2019

(65) Prior Publication Data
US 2020/0264571 A1      Aug. 20, 2020

(30) Foreign Application Priority Data

Dec. 15, 2017 (JP) .............................. JP2017-240735

(51) Int. Cl.
*G05B 13/04*      (2006.01)
*G05B 19/05*      (2006.01)
(52) U.S. Cl.
CPC ........... *G05B 13/048* (2013.01); *G05B 19/05* (2013.01); *G05B 2219/14027* (2013.01)
(58) Field of Classification Search
CPC .................. G05B 13/048; G05B 19/05; G05B 2219/14027
See application file for complete search history.

(56) References Cited

U.S. PATENT DOCUMENTS 5,519,605 A * 5/1996 Cawlfield ............ G05B 13/048
700/31
2004/0098145 A1   5/2004 Zhenduo
(Continued)

FOREIGN PATENT DOCUMENTS

JP      H8-237994 A      9/1996
JP      2012-104047 A    5/2012
(Continued)

OTHER PUBLICATIONS

An English translation of the International Search Report("ISR") of PCT/JP2018/045693 dated Mar. 19, 2019.
(Continued)

*Primary Examiner* — Ronald D Hartman, Jr.
(74) *Attorney, Agent, or Firm* — Metrolex IP Law Group, PLLC

(57) ABSTRACT

A control system for causing an output of a control target to follow a command includes: a first processing device which is a processing device having a first processor and a prediction model that defines a correlation between a state variable with respect to the predetermined control target and a control input to the predetermined control target in the form of a state equation, performs model predictive control using the first processor, and outputs a servo command corresponding to the control input at an initial time point of the prediction interval; and a second processing device which is a processing device having a second processor different from the first processor and a feedback system including controllers to which a feedback signal related to an operation of the predetermined control target is input and receiving the servo command from the first processing device, and performs feedback control using the second processor.

8 Claims, 8 Drawing Sheets

(56) References Cited

U.S. PATENT DOCUMENTS

| | | | |
|---|---|---|---|
| 2007/0055402 A1* | 3/2007 | Guez | G05B 13/048 |
| | | | 700/104 |
| 2013/0035914 A1* | 2/2013 | Igarashi | G05B 13/041 |
| | | | 703/2 |
| 2014/0371899 A1 | 12/2014 | Nagaoka | |
| 2017/0153609 A1* | 6/2017 | Namie | G05B 13/026 |
| 2017/0153614 A1* | 6/2017 | Namie | G05B 13/0265 |
| 2018/0267486 A1* | 9/2018 | Manabe | G05B 13/024 |
| 2019/0022861 A1* | 1/2019 | Namie | B25J 9/1664 |
| 2019/0127049 A1* | 5/2019 | Blanding | B64C 13/505 |
| 2019/0317516 A1* | 10/2019 | Zhu | G05D 1/0223 |
| 2020/0362819 A1* | 11/2020 | Abbaszadeh | F03D 7/045 |

FOREIGN PATENT DOCUMENTS

| | | |
|---|---|---|
| JP | 2017-102617 A | 6/2017 |
| WO | 2013/140679 A1 | 9/2013 |

OTHER PUBLICATIONS

An English translation of the Written Opinion("WO") of PCT/JP2018/045693 dated Mar. 19, 2019.

Yuta Sakurai et al., Offset Compensation of Continuous Time Model Predictive Control by Disturbance Estimation, Journal of Institute of Systems, Control and Information Engineers, 2012, p. 10-18, vol. 25, No. 7, Japan; Concise explanation of relevance provided in the specification, Relevance is indicated in the (translated) ISR mailed on Mar. 19, 2019.

U. Maeder et al., Linear offset-free model predictive control, 2009, p. 2214-2222, vol. 45, No. 10, Automatica, Japan; Concise explanation of relevance provided in the specification, Relevance is indicated in the (translated) ISR mailed on Mar. 19, 2019.

Toshiyuki Ohtsuka et al., "Practical applications of control by real-time optimization", 2015, ISBN 978-4-339-03210-9, Corona Publishing Co., Ltd., Tokyo, Japan; Relevance is indicated in the (translated) ISR/WO mailed on Mar. 19, 2019.

Toshiyuki Ohtsuka, "A continuation/GMRES method for fast computation of nonlinear receding horizon control", 2004, p. 563-574, vol. 40, Issue 4, ISSN 0005-1098, Automatica, Japan; Concise explanation of relevance provided in the specification, Relevance is indicated in the (translated) ISR/WO mailed on Mar. 19, 2019.

Extended European search report (EESR) dated Jul. 14, 2021 in a counterpart European patent application.

* cited by examiner

CONTROL SYSTEM

TECHNICAL FIELD

The present invention relates to a control system for servo control of a control target.

BACKGROUND ART

To cause a control target to move while following a command trajectory, feedback control is generally used. For example, in an articulated robot, a servo motor of each joint shaft is controlled such that a robot control device causes the position of a fingertip portion of the robot to follow a command trajectory set (instructed) in advance using feedback control. However, general feedback control has a problem that an actual trajectory of a robot deviates from a command trajectory because response delay inevitably occurs in each servo motor. In order to prevent such deviation with respect to a command trajectory, a technology with respect to model predictive control is used.

However, even when model predictive control is used, steady-state deviation may be generated when a target constantly changes. Accordingly, it is conceivable to remove steady-state deviation by serially connecting an integrator to a compensator when model predictive control is used. In addition, it is possible to remove assumed disturbance in principle by regarding the disturbance as a new state and incorporating it into a model. For example, in NPL 1 and 2, methods of constructing a disturbance observer and canceling steady-state deviation using disturbance estimated by the disturbance observer are proposed.

CITATION LIST

Non Patent Literature

NPL 1: Yuta Sakurai and Toshiyuki Ohtsuka: Offset Compensation of Continuous Time Model Predictive Control By Disturbance Estimation; Journal of Institute of Systems, Control and Information Engineers, Vol. 25, No. 7, pp. 10-18 (2012)

NPL 2: U. Maeder and M. Morari: Linear offset-free model predictive control; Automatica, Vol. 45, No. 10, pp. 2214-2222 (2009)

SUMMARY OF INVENTION

Technical Problem

It is ascertained that an operation load when model predictive control is used is generally high. This is because, in a control device having a processor mounted therein such that it can execute model predictive control, it is necessary to execute an operation process with respect to model predictive control in a prediction interval relatively longer than an operation period of the processor, which is an operation process with respect to an optimal control problem in general, and to determine a control input in the operation period. Accordingly, in order to realize follow-up control corresponding to a constantly changing target trajectory, the processor needs to continuously execute such an operation process with respect to model predictive control having a high operation load. Therefore, it is difficult to realize precise model predictive control due to processing capability of the processor.

In addition, when a feedback system is constructed for servo control of a control target on the basis of a control input created through model predictive control, it is desirable to perform an operation process with respect to the feedback system in as short operation period as possible in order to improve control accuracy and control stability. When the operation period decreases, the operation load of the operation process with respect to the feedback system increases, and if model predictive control is executed according to the operation period, the operation load with respect model predictive control also increases.

An object of the present invention devised in view of such problems is to provide a control system which realizes suitable servo control using model predictive control.

Solution to Problem

In the present invention, to accomplish the aforementioned object, a processor which performs an operation process with respect to model predictive control and a processor which performs an operation process with respect to a feedback system are distinguished from each other, and a system for servo control of a control target is constructed. By employing this configuration, it is possible to separate the operation process with respect to model predictive control from the operation process with respect to the feedback system and avoid concentration of operation loads on the processors of a control system.

Specifically, the present invention is a control system for causing an output of a predetermined control target that is a servo control target to follow a predetermined command, the control system including: a first processing device which is a processing device having a first processor and a prediction model that defines a correlation between a predetermined state variable with respect to the predetermined control target and a control input to the predetermined control target in the form of a predetermined state equation, the first processing device performing model predictive control on the basis of the prediction model according to a predetermined evaluation function in a prediction interval having a predetermined duration using the first processor and outputting a servo command corresponding to the control input at at least an initial time point of the prediction interval; and a second processing device which is a processing device having a second processor different from the first processor and a predetermined feedback system including one or a plurality of controllers to which a feedback signal related to an operation of the predetermined control target is input, and receiving the servo command output from the first processing device, the second processing device performing feedback control according to the predetermined feedback system on the basis of the received servo command using the second processor.

The control system of the present invention includes the first processing device and the second processing device, the first processor is provided in the first processing device, and the second processor is provided in the second processing device. Accordingly, various processes in the first processing device are executed by the first processor and various processes in the second processing device are basically executed by the second processor. In addition, an operation process with respect to model predictive control using a prediction model is performed by the first processor in the first processing device. In the model predictive control, a prediction interval having a predetermined duration is set, an operation process according to a predetermined evaluation function is performed in the prediction interval at each control time point, and a servo command corresponding to a control input calculated at at least an initial time point of the prediction interval is created and output to the second processing device. Meanwhile, a value of a state variable representing a state of the predetermined control target is provided to model prediction control. Accordingly, in the model predictive control performed in the first processing device, the prediction interval is shifted with the lapse of control time and thus so-called receding horizon control is executed.

In addition, in the second processing device, an operation process according to the feedback system is performed by the second processor on the basis of the servo command output from the first processing device. This operation process according to the feedback system considers details of processes performed by one or a plurality of controllers included in the feedback system and differs from the aforementioned operation process with respect to the model predictive control. Accordingly, the operation process with respect to the model predictive control and the operation process with respect to the feedback system are executed by different processors in the control system of the present invention, and thus concentration of operation loads on a single processor can be avoided. Further, it is possible to suit processing capability of each processor to each operation process and obtain the accuracy, stability and the like of more suitable servo control performed by the control system by employing different processors corresponding to respective operation processors as described above.

Here, in the aforementioned control system, as an example, the following three specific forms may be conceived. In the first form, the first processor may execute the model predictive control in a first operation period and the second processor may execute the feedback control in a second operation period shorter than the first operation period. In this case, the first processing device may create the servo command corresponding to the control input at the initial time point of the prediction interval on the basis of an operation result of the model predictive control executed in the first operation period and output the servo command to the second processing device, and the second processing device may create an interpolated servo command according to a difference between the first operation period and the second operation period on the basis of the servo command from the first processing device and perform the feedback control using the second processor on the basis of the servo command and the interpolated servo command in the second operation period.

In the first processor which performs the operation process with respect to the model predictive control, it is possible to prevent operation loads for the model predictive control from unnecessarily increasing by setting the operation period of the operation processor to be relatively long. In addition, in the second processor which performs the operation process with respect to the feedback system, it is easy to secure stability during feedback control by setting the operation period of the operation processor to be relatively short. However, in this case, the operation period in the first processing device is not consistent with the operation period in the second processing device. Particularly, since the operation period in the second processing device is relatively short, servo commands from the first processing device are intermittently provided instead of being provided at all operation time points corresponding to the second operation period from the viewpoint of the second processing device. Accordingly, in this case, a feedback control result in the second processing device may vary. Therefore, to realize stable feedback control by the second processing device, in the second processing device, the second processor creates an interpolated servo command for interpolating a command corresponding to a time point corresponding to the second operation period which is a time point at which a servo command is not provided on the basis of a servo command provided from the first processing device. Then, the second processor performs the operation process for feedback control on the basis of the provided servo command and the created interpolated servo command.

In addition, in the second form, the first processor may execute the model predictive control in the first operation period and the second processor may execute the feedback control in the second operation period shorter than the first operation period. In this case, the first processing device may create a plurality of servo commands corresponding to the control input at a plurality of time points including the initial time point and corresponding to the second operation period in a predetermined interval including the initial time point of the prediction interval and corresponding to the first operation period in the model predictive control on the basis of an operation result of the model predictive control executed in the first operation period using the first processor in the first operation period and output the plurality of servo commands to the second processing device, and the second processing device may perform the feedback control using the second processor on the basis of the plurality of servo commands in the second operation period according to time sequences associated with the plurality of servo commands.

Even in the aforementioned form, the operation period in the first processing device is not consistent with the operation period in the second processing device. Here, the model predictive control performed by the first processor is executed in the first operation period. Then, in the first processing device, a plurality of servo commands at a plurality of time points including the initial time point of the prediction interval and corresponding to the second operation period are created in the prediction interval and output to be used for the operation process with respect to the feedback control in the second processing device. The plurality of servo commands are calculated by the first processor in the first operation period. Then, the second processing device provides the plurality of servo commands to the operation process with respect to the feedback control in the second operation period according to time sequences associated with the plurality of servo commands and thus can prevent variation in the feedback control result. Meanwhile, the second processing device can integrate the servo commands at the plurality of time points transmitted from the first processing device, store the integrated servo commands in a storage unit and sequentially provide the servo commands stored depending on the time points for the operation process with respect to the feedback control.

In addition, in the third form, the first processor may be configured to execute a plurality of operation processes in different operation periods and execute the model predictive control in the first operation period, and the second processor may execute the feedback control in the second operation period shorter than the first operation period. In this case, the first processing device may create the servo command corresponding to the control input at a predetermined time point corresponding to the same operation period for creation as the second operation period in a predetermined interval including the initial time point of the prediction interval and corresponding to the first operation period on the basis of an operation result of the model predictive control executed in the first operation period using the first processor in the operation period for creation and output the servo command to the second processing device, and the second processing device may perform the feedback control using the second processor on the basis of the servo command in the second operation period.

In the aforementioned form, the first processor is configured such that it can execute a plurality of operation processes in different operation periods. That is, the first processor executes the model predictive control in the relatively long first operation period and executes a process of creating a servo command on the basis of an operation result of the model predictive control in the relatively short operation period for creation. In addition, the operation period for creation is the same as the second operation period that is an operation period for the second processor to perform the feedback control. That is, the first processor creates a suitable servo command in the operation period for creation in which the suitable servo command can be created in view of control accuracy of the feedback control, and the like in the second processing device while performing model predictive control in the first operation period suitable for the model predictive control in view of control accuracy, processing load and the like of the model predictive control. Servo commands created by the first processor are sequentially transferred to the second processing device, and the second processing device can prevent variation in feedback control results by using the servo commands for the operation process with respect to the feedback control in the second operation period.

Here, although relatively high followability for commands is expected in the model predictive control performed by the first processor in the above-described control system, it is difficult to realize suitable followability when the accuracy of a prediction model is not sufficient. Further, there are cases in which it is not easy to create a prediction model in which characteristics of a predetermined control target are sufficiently reflected depending on an aspect of the predetermined control target. Based on this point, in the above-described control system, the second processing device may further have a second processing side control model unit including a control model which models the predetermined feedback system and the predetermined control target, the first processing device may include an upper model corresponding to the control model included in the second processing side control model unit and create the servo command on the basis of the control input using the upper model, and the second processing device may perform model follow-up control as the feedback control according to the control model included in the second processing side control model unit using the second processor. By performing the model follow-up control on the basis of the control model included in the second processing side control model unit in this manner, an error of the prediction model can be absorbed, and as a result, relatively high followability can be maintained for commands even if the accuracy of the prediction model is not sufficient.

In addition, in the aforementioned control system, the prediction model may be the same control model as the control model included in the second processing side control model unit. As a result, it is possible to improve followability for the control system and reduce effort required to identify a prediction model.

Furthermore, in the aforementioned control system, predetermined model follow-up control gains in the model follow-up control according to the control model included in the second processing side control model unit may be equal to or less than predetermined feedback control gains of the controllers included in the predetermined feedback system. By employing this configuration, a predetermined control target can suitably follow the control model included in the second processing side control model unit and thus followability for the control system can be improved. Meanwhile, although a position proportional gain, a speed proportional gain, a speed integration gain, and the like may be conceived as the predetermined model follow-up control gains and the predetermined feedback control gains, for example, comparison between the predetermined model follow-up control gains and the predetermined feedback control gains relates to control gains of the same type (e.g., comparison between speed proportional gains).

In addition, in the aforementioned control system, when the predetermined control target includes a plurality of control axes, the prediction model may correspond to each of the plurality of control axes and may be defined by the predetermined state equation, the predetermined feedback system may be associated with each of the plurality of control axes, the control model included in the second processing side control model unit may be associated with each of the plurality of control axes, and the plurality of predetermined model follow-up control gains in the second processing side control models associated with the plurality of control axes may be set to the same value in the plurality of control axes. By employing this configuration, followabilities for commands in the respective control axes can be adjusted to the same degree.

Furthermore, in the above-described control system, the first processing device and the second processing device may be devices mounted in separate housings or may be formed as a single device mounted in an identical housing shared therebetween as another method.

Advantageous Effects of Invention

It is possible to provide a control system which realizes suitable servo control using model predictive control.

DESCRIPTION OF EMBODIMENTS

Embodiment 1

Figure 1:
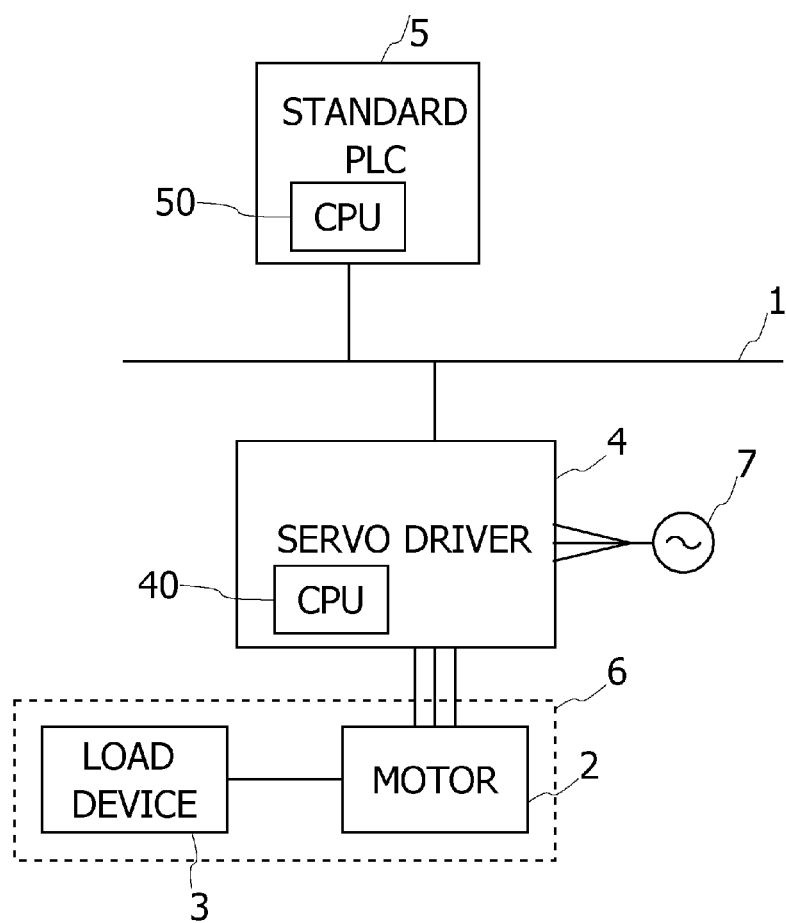
FIG. 1 is a first diagram illustrating a schematic configuration of a control system of the present invention.

FIG. 1 is a schematic configuration diagram of a control system according to an embodiment of the present invention. The control system includes a network 1, a servo driver 4, and a standard programmable logic controller (PLC) 5. The servo driver 4 is a control device for performing servo control of a plant 6 including a motor 2 and a load device 3. In the control system, the servo driver 4 performs feedback control of the plant 6 such that the plant 6 follows a predetermined command signal. The servo driver 4 includes a central processing unit (CPU) 40 and an operation with respect to corresponding predetermined feedback is performed by the CPU 40. Details of predetermined feedback control will be described later. Here, various mechanisms (e.g., arms of industrial robots and conveyance devices) can be exemplified as the load device 3 constituting the plant 6, and the motor 2 is incorporated in the load device 3 as an actuator for driving the load device 3. For example, the motor 2 may be an AC servo motor. Meanwhile, an encoder which is not illustrated is provided in the motor 2 and feedback transmission of parameter signals (a position signal, a speed signal, and the like) with respect to operation of the motor 2 to the servo driver 4 is performed by the encoder.

The standard PLC 5 creates a servo command with respect to an operation (motion) of the plant 6 and transmits the servo command to the servo driver 4. The standard PLC 5 includes a CPU 50 different from the CPU 40, and the CPU 50 performs an operation with respect to creation of a servo command for the aforementioned predetermined feedback control by the servo driver 4. Details of creation of the servo command will be described later. The servo driver 4 receives the servo command from the standard PLC 5 through the network 1 and receives a feedback signal output from the encoder connected to the motor 2. Then, the servo driver 4 supplies a driving current to the motor 2 on the basis of the servo command and the feedback signal from the encoder such that feedback control with respect to driving of the plant 6, that is output of the plant 6, follows a predetermined command. As this supplied current, AC power transmitted from an AC power supply 7 to the servo driver 4 is used. Although the servo driver 4 is of a type that receives three-phase alternating current in the present embodiment, it may be a type that receives single-phase alternating current. Further, for servo control of the plant 6, model predictive control is executed by a model predictive control unit 53, as illustrated in FIG. 2.

Figure 2:
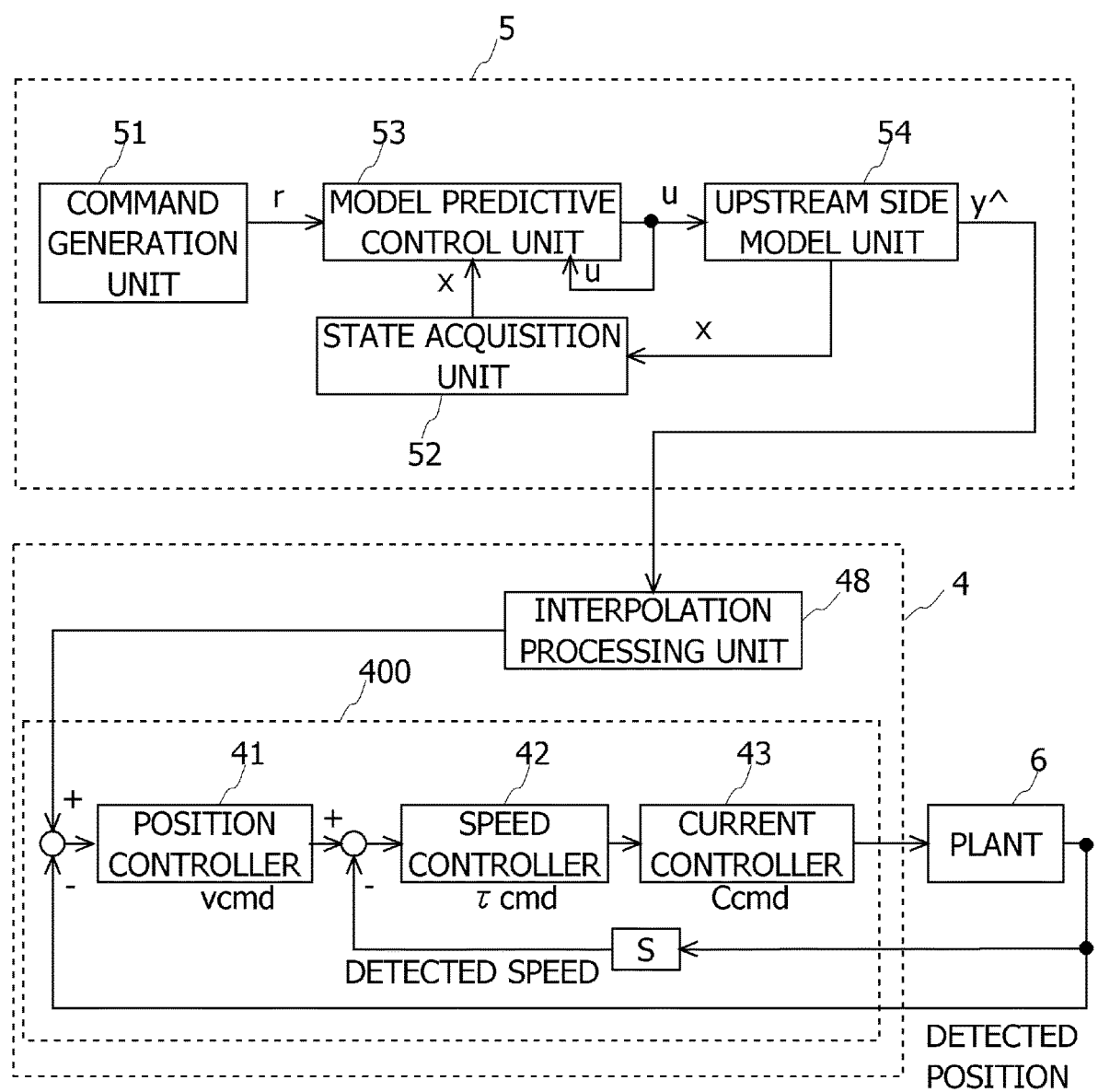
FIG. 2 is a first diagram illustrating control structures of a standard PLC and a servo driver included in the control system illustrated in FIG. 1.

Here, control structures in the standard PLC 5 and the servo driver 4 are described on the basis of FIG. 2. The standard PLC 5 includes a command creation unit 51, a state acquisition unit 52, a model predictive control unit 53, and an upstream side model unit 54. In addition, processes performed by the command creation unit 51, the state acquisition unit 52, the model predictive control unit 53, and the upstream side model unit 54 are operated and executed by the CPU 50. The command creation unit 51 creates a command r for instructing the output of the plant 6. In addition, the upstream side model unit 54 includes an upper model that models the plant 6 and a feedback control structure 400 which will be described later and simulates the output of the plant 6 using the upper model. An output y^ of the upper model which is a simulation result is provided as a servo command to the servo driver 4.

The state acquisition unit 52 acquires a value of a state variable included in a state x with respect to the upper model of the upstream side model unit 54 (hereinafter referred to simply as "state x with respect to the upper model") provided to model predictive control performed by the model predictive control unit 53. Then, the model predictive control unit 53 executes model predictive control (receding horizon control) using the state x with respect to the upper model of the upstream side model unit 54 acquired by the state acquisition unit 52 and a control input u to the upper model which is output by the model predictive control unit 53.

Specifically, the model predictive control unit 53 includes a predictive model which defines a correlation between the state x with respect to the upper model and the control input u to the upper model using the following state equation (Equation 1). Meanwhile, Equation 1 below is a nonlinear state equation. For example, predetermined physical features of the plant 6 corresponding to the upper model may be reflected in the predictive model.

[Math. 1]

$$\dot{x}(t) = P(x(t), u(t)) \quad \text{(Equation 1)}$$

Here, the model predictive control unit 53 performs model predictive control on the basis of the predictive model represented by Equation 1 according to an evaluation function represented by Equation 2 below using the state x with respect to the upper model and the control input u to the upper model as inputs in a prediction interval having a predetermined duration T.

[Math. 2]

$$J = \varphi(x(t+T)) + \int_{t}^{t+T} L(x(\tau), u(\tau)) d\tau \quad \text{(Equation 2)}$$

A value of the control input u at an initial time point t of the prediction interval which is calculated in model predictive control is output as a control input u to the upper model corresponding to the command r at that time point t. Further, in model predictive control, the prediction interval having the predetermined duration T is set at the control time point each time and the control input u at the control time point is calculated according to the evaluation function of Equation 2 and input to the upstream side model unit 54 each time. Then, the output y^ that is a simulation result in the upstream side model unit 54 is transmitted to the servo driver 4. A problem of obtaining an operation amount having the value of an evaluation function J in the form of Equation 2 as the best value is widely known as an optimal control problem and an algorithm of calculating a numerical solution thereof is disclosed as a known technology. A continuation method can be exemplified as such a technology and is disclosed in detail in a known literature "A continuation/GMRES method for fast computation of nonlinear receding horizon control", T. Ohtsuka, Automatica, Vol. 40, pp. 563-574, 2004, for example.

In the continuation method, an input U(t) in model predictive control is calculated by solving simultaneous linear equations with respect to the input U(t) represented as Equation 3 below. Specifically, Equation 3 is solved and dU/dt is numerically integrated to update the input U(t). In this manner, iteration is not performed in the continuation method and thus an operation load for calculating the input U(t) at each time point can be controlled.

[Math. 3]

$$\frac{\partial F}{\partial U}\dot{U} = -\zeta F - \frac{\partial F}{\partial x}\dot{x} - \frac{\partial F}{\partial t} \quad \text{(Equation 3)}$$

Here, F and U(t) are represented by Equation 4 below.

[Math. 4]

$$F(U(t), x(t), t) = \begin{bmatrix} \frac{\partial H}{\partial u}(x_0^*(t), u_0^*(t), \lambda_1^*(t), \mu_0^*(t)) \\ C(x_0^*(t), u_0^*(t)) \\ \vdots \\ \frac{\partial H}{\partial u}(x_{N\_1}^*(t), u_{N\_1}^*(t), \lambda_N^*(t), \mu_{N\_1}^*(t)) \\ C(x_{N\_1}^*(t), u_{N\_1}^*(t)) \end{bmatrix} \quad \text{(Equation 4)}$$

$$U(t) = [u_0^{*T}(t), \mu_0^{*T}(t), \ldots, u_{N\_1}^{*T}(t), \mu_{N\_1}^{*T}(t)]$$

Here, H is a Hamiltonian, λ is a costate, and μ is a Lagrange multiplier having a constraint condition of C=0.

Next, a control structure of the servo driver 4 will be described. The servo driver 4 has an interpolation processing unit 48 and a feedback control structure 400, and the feedback control structure 400 includes a position controller 41, a speed controller 42, and a current controller 43. Processes in the interpolation processing unit 48 and the feedback control structure 400 are operated and executed by the CPU 40. The output of the standard PLC 5, that is the upper model output y^, which is a simulation result of the upstream side model unit 54, is transferred to the interpolation processing unit 48 as a servo command. The interpolation processing unit 48 creates an interpolated servo command on the basis of the upper model output y^ and transfers the interpolated servo command along with the upper model output y^ that is the servo command to the feedback control structure 400. The interpolation processing unit 48 will be described in detail later. In the present embodiment, feedback control in the feedback control structure 400, that is operation processes performed by the position controller 41, the speed controller 42 and the current controller 43 are executed on the basis of the servo command and the interpolated servo command.

In the feedback control structure 400, the position controller 41 may perform proportional control (P control), for example. Specifically, the position controller 41 calculates a speed command vcmd by multiplying a positional deviation that is a deviation between the servo command or the interpolated servo command output from the interpolation processing unit 48 and a detected position with respect to the plant 6 by a predetermined position proportional gain.

Next, the speed controller 42 may perform proportional-plus-integral control (PI control), for example. Specifically, the speed controller 42 calculates a torque command τcmd by multiplying an integration amount of a speed deviation that is a deviation between the speed command vcmd calculated by the position controller 41 and a detected speed with respect to the plant 6 by a predetermined speed integration gain and multiplying the sum of the calculation result and the speed deviation by a predetermined speed proportional gain. In addition, the speed controller 42 may perform P control instead of PI control.

Next, the current controller 43 outputs a current command Ccmd on the basis of the torque command τcmd calculated by the speed controller 42, and the motor 2 is driven and controlled thereby. The current controller 43 includes a filter (primary lowpass filter) or a plurality of notch filters with respect to torque commands and has a cutoff frequency and the like with respect to performances of these filters as control parameters.

In the control system including the standard PLC 5 and the servo driver 4 configured in this manner, model predictive control is performed by the model predictive control unit 53 in the standard PLC 5 for servo control for causing the plant 6 to follow the command r created in the command creation unit 51, the upper model output y^ is calculated on the basis of the control input u created thereupon and transferred to the servo driver 4, and the servo driver 4 performs feedback control of the plant 6 on the basis of the upper model output y^. Here, the operation process with respect to model predictive control is executed by the CPU 50 in the standard PLC 5 and the operation process with respect to feedback control is executed by the CPU 40 in the servo driver 4. Accordingly, it is possible to avoid concentration of operation loads on a single processor by distributing operation processes for servo control of the plant 6 to two processors. Particularly, it is possible to smoothly realize the operation process with respect to model predictive control by using the CPU 50 having relatively high processing capability for the standard PLCS and promote realization of suitable servo control of the plant 6 for the entire control system while reducing the processing capability of the CPU 40 of the servo driver 4. Since the operation load of model predictive control executed by the model predictive control unit 53 is relatively high, it is considerably useful that different processors are used according to operation processes as described above and furthermore it is possible to suit processing capability of each processor to each operation process. Accordingly, more suitable accuracy, stability and the like of servo control performed by the control system can be achieved.

Figure 3:
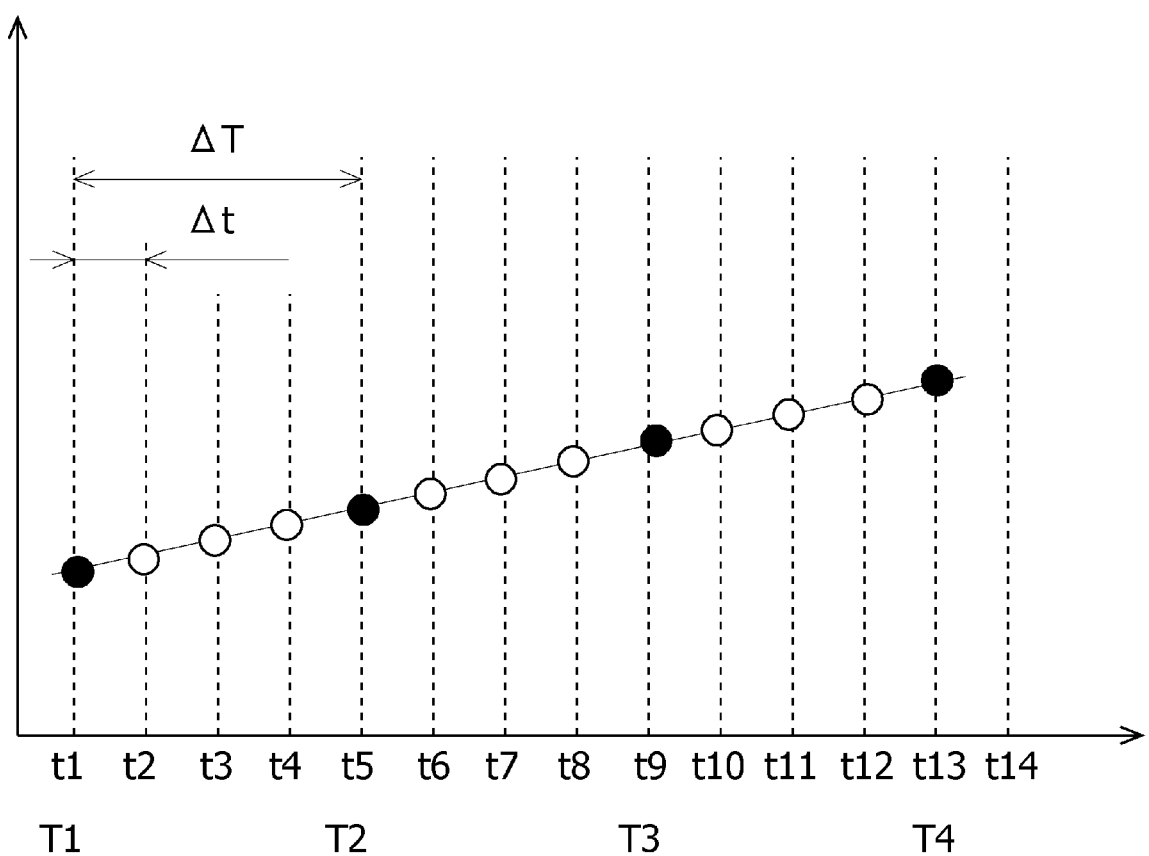
FIG. 3 is a diagram for explaining a servo command provided to feedback control in the servo driver of the control system having the control structure illustrated in FIG. 2.

Here, the operation period of the CPU 50 of the standard PLC 5 is set such that it is longer than that of the CPU 40 of the servo driver 4. Accordingly, an aspect of interpolation of a control command used for servo control of the plant 6 will be described on the basis of the fact that the standard PLC 5 and the servo driver 4 have different operation periods based on FIG. 3. The horizontal axis of FIG. 3 represents time, time points t1 to t14 correspond to the operation period of the CPU 40 and time points T1 to T4 correspond to the operation period of the CPU 50. The time point t1 and the time point T1, the time point t5 and the time point T2, the time point t9 and the time point T3, and the time point t13 and the time point T4 are synchronized with each other. Specifically, the operation period ΔT of the CPU 50 is a quadruple of the operation period Δt of the CPU 40, as shown in FIG. 3. The operation period Δt of the CPU 40 is set to be relatively short in this manner, in other words, the speed of the feedback control operation of the CPU 40 is increased in order to realize feedback control performed by the feedback control structure 400 with high accuracy and stability. On the other hand, the operation period ΔT of the standard PLC 5 is set to be relatively long such that model predictive control is executable.

When the operation period of the CPU 50 is set to be longer than the operation period of the CPU 40, as shown in FIG. 3, a situation in which an operation time point for feedback control in the servo driver 4 is reached while the servo command (which is the upper model output y^ that is a simulation result of the upstream side model unit 54 and is denoted by a black circle in FIG. 3) is not provided from the standard PLC 5 occurs. For example, although the servo command is created at the time points T1, T2, T3 and T4 and provided to the servo driver 4 in the standard PLC 5 having the CPU 50, the servo command is provided from the standard PLC 5 at the time point t1 synchronized with the time point T1, for example, and can be used for feedback control operation in the servo driver 4 having the CPU 40 but the serve command is not provided from the standard PLC 5 at the time points t2 to t4 between the time points T1 to T2 and thus it is difficult to realize a suitable feedback control operation using the upper model output y^ in this state.

Accordingly, in the present embodiment, the interpolation processing unit 48 performs a process of interpolating values of servo commands for the feedback control operation at operation times (e.g., the time points t2, t3, t4, and the like) of the CPU 40 which do not correspond to operation time points of the CPU 50 on the basis of a difference between the operation period ΔT of the CPU 50 and the operation period Δt of the CPU 40. In FIG. 3, this interpolated servo command is denoted by a white circle and referred to as an interpolated servo command. With respect to an interpolation process, a known extrapolation technique can be used. In addition, the interpolated servo command may be created by the interpolation processing unit 48 using a known interpolation technique as another method if a specific delay time is set until the servo command is provided from the standard PLC 5 and used for the feedback control operation. The servo command and the interpolated servo command are transferred from the interpolation processing unit 48 to the feedback control structure 400 on the basis of operation time points corresponding thereto and provided for the feedback control operation in the operation period Δt.

When the servo driver 4 has the interpolation processing unit 48 in this manner, it is possible to realize suitable servo control of the plant 6 even when the CPU 40 and the CPU 50 have different operation periods. In other words, it is possible to realize suitable servo control of the plant 6 as a control system without unnecessarily improving the processing capabilities of the CPU 40 and the CPU 50.

Embodiment 2

Figure 4:
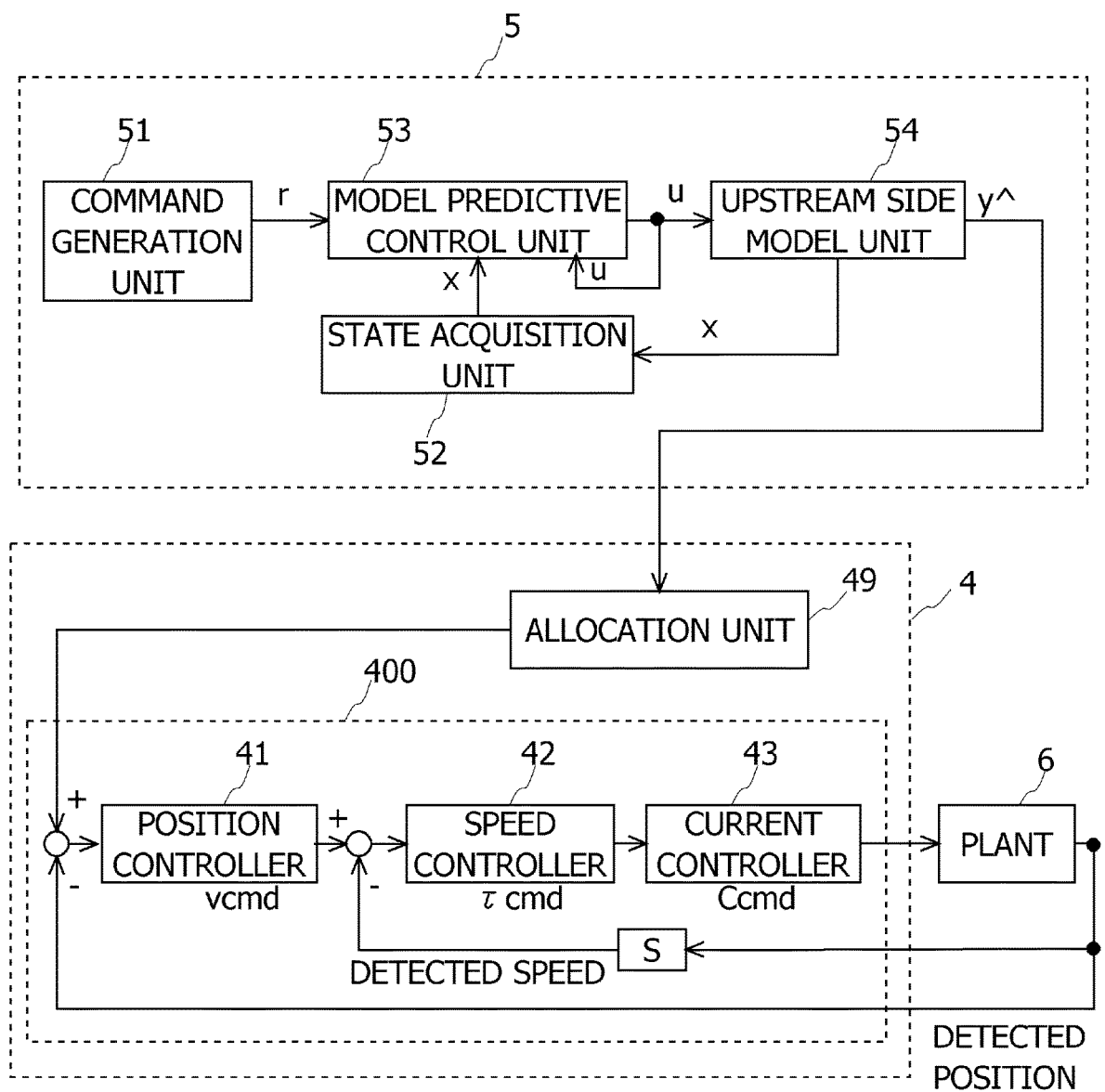
FIG. 4 is a second diagram illustrating control structures of the standard PLC and the servo driver included in the control system illustrated in FIG. 1.
Figure 5:
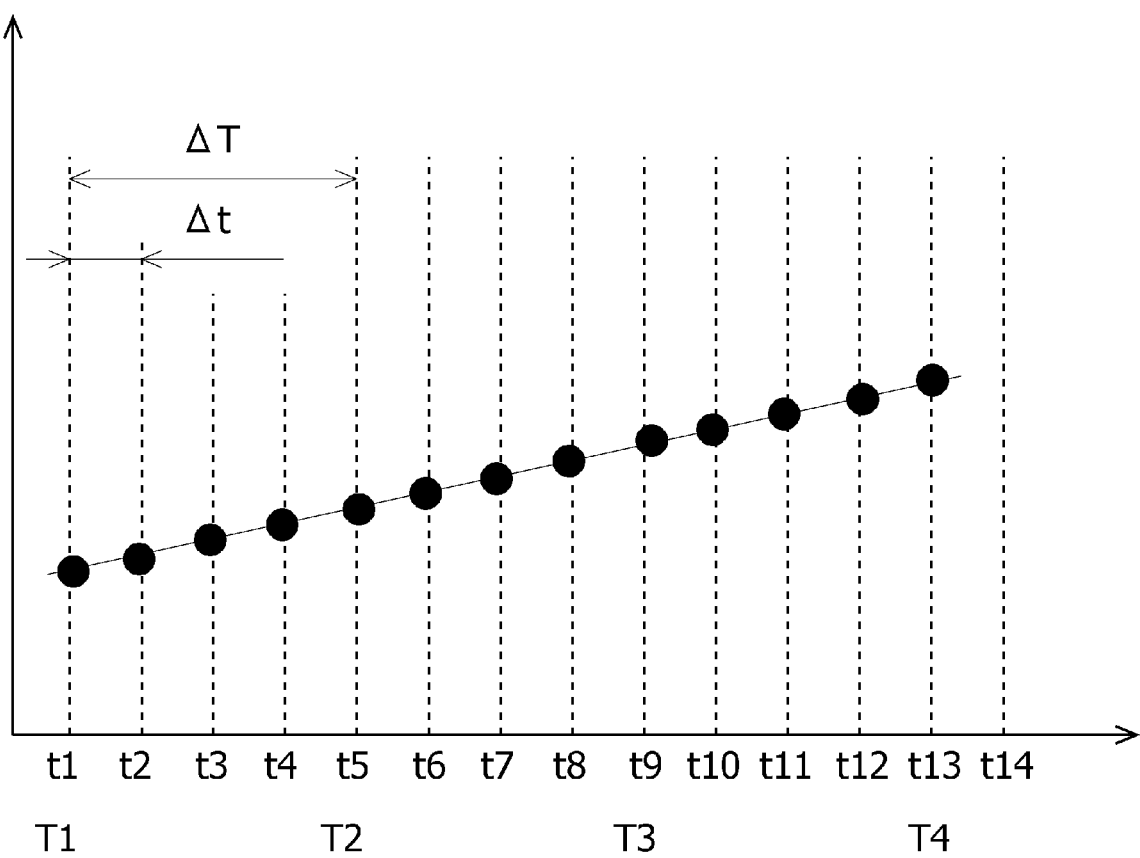
FIG. 5 is a diagram for explaining a servo command provided to feedback control in the servo driver of the control system having the control structure illustrated in FIG. 4.

Next, a second embodiment of a control system of the present invention will be described on the basis of FIG. 4 and FIG. 5. FIG. 4 is a diagram illustrating control structures with respect to the control system according to the present embodiment, and components substantially the same as those included in the control structures illustrated in FIG. 2 are denoted by the same reference numerals and detailed description thereof is omitted. Meanwhile, the control structures illustrated in FIG. 4 differ from the control structures illustrated in FIG. 2 in that an allocation unit 49 is provided instead of the interpolation processing unit 48. In addition, the horizontal axis of FIG. 5 represents time, time points t1 to t14 correspond to the operation period of the CPU 40, and time points T1 to T4 correspond to the operation period of the CPU 50. The time point t1 and the time point T1, the time point t5 and the time point T2, the time point t9 and the time point T3, and the time point t13 and the time point T4 are synchronized with each other.

In the present embodiment, the operation period ΔT of the CPU 50 of the standard PLC 5 is also set to a quadruple of the operation period Δt of the CPU 40 of the servo driver 4 as in the first embodiment. Accordingly, it is difficult to improve the accuracy of the feedback control operation of the CPU 40 even if a servo command created by the standard PLC 5 is supplied to the servo driver 4 as it is in the operation period of the CPU 50, as illustrated in the first embodiment. Therefore, the present embodiment focuses on the operation with respect to model predictive control performed by the model predictive control unit 53 in the standard PLC 5. Although the control input u in the prediction interval represented by the predetermined duration T of Equation 2 is calculated and the upper model output y^ corresponding to the control input u at the initial time point t is output from the standard PLC 5 to the servo driver 4 in the corresponding operation in the first embodiment, not only the upper model output y^ corresponding to the control input u at the initial time point t of the prediction interval but also a plurality of upper model outputs y^ including upper model outputs y^ corresponding to control inputs u at the following time points are output to the servo driver 4 as servo commands in the present embodiment.

Specifically, in model predictive control performed by the model predictive control unit 53, the control input u at the initial time point t of the prediction interval is calculated. The upstream side model unit 54 calculates upper model outputs y1^, y2^, y3^ and y4^ at four time points (ΔT, ΔT+Δt, ΔT+2Δt and ΔT+3Δt) obtained by dividing the operation period ΔT by 4 on the basis of the fact that the operation period ΔT of the CPU 50 is a quadruple of the operation period Δt of the CPU 40 on the basis of the calculated control input u. Specifically, these upper model outputs are calculated through method 1 described below.

(Method 1)

The upper model outputs y1^, y2^, y3^ and y4^ which are future values are calculated using a nonlinear model P(t) (refer to the aforementioned Equation 1) on the assumption that the control input u is constant.

$$y1\hat{}=y(t+\Delta T)=y(t)+\Delta T\times P(t)$$

$$y2\hat{}=y(t+\Delta T+\Delta t)=y1\hat{}+\Delta t\times P(t+\Delta t)$$

$$y3\hat{}=y(t+\Delta T+2\Delta t)=y2\hat{}+\Delta t\times P(t+2\Delta t)$$

$$y4\hat{}=y(t+\Delta T+3\Delta t)=y3\hat{}+\Delta t\times P(t+3\Delta t)$$

In addition, as another method, the aforementioned upper model outputs can also be calculated through method 2 described below.

(Method 2)

The upper model outputs y1^, y2^, y3^ and y4^ are calculated using a differential value provided through the aforementioned Equation 1 instead of the control input u.

$$y1\hat{}=y(t+\Delta T)=y(t)+\Delta T\times P(t)$$

$$y2\hat{}=y(t+\Delta T+\Delta t)=y(t)+(\Delta T+\Delta t)\times P(t)$$

$$y3\hat{}=y(t+\Delta T+2\Delta t)=y(t)+(\Delta T+2\Delta t)\times P(t)$$

$$y4\hat{}=y(t+\Delta T+3\Delta t)=y(t)+(\Delta T+3\Delta t)\times P(t)$$

The upper model outputs y1^, y2^, y3^ and y4^ calculated by the upstream side model unit 54 in this manner are supplied to the servo driver 4 as servo commands. Meanwhile, although the model predictive control unit 53 performs the operation with respect to model predictive control in the operation period ΔT, model predictive control performed after the model predictive control (previous predictive control) through which the control input has been calculated is executed on the basis of a state x in the upper model corresponding to a control input at a time point t+4Δt (i.e., t+T) in the previous predictive control. As a result, an operation timing in model predictive control can be consistent with an operation timing in the servo driver 4.

In addition, in the servo driver 4, the allocation unit 49 receives and stores the upper model outputs y1^, y2^, y3^ and y4^ at the four time points as servo commands. The allocation unit 49 transfers the respective upper model outputs to the feedback control structure 400 in the operation period of the CPU 40 according to time sequences respectively associated with the received upper model outputs y1^, y2^, y3^ and y4^ such that they are provided for the feedback control operation in the operation period Δt. Specifically, the allocation unit 49 receives the upper model outputs y1^, y2^, y3^ and y4^ from the standard PLC 5 at the time point t1 (time point T1) and allocates the upper model output y1^ corresponding to the initial time point t1 from among them to the feedback control structure 400. Next, at the time point t2, the allocation unit 49 allocates the upper model output y2^ corresponding to the time point t2, that is the time point t1+Δt from among the upper model outputs y^ that have already been received at the time point t1 to the feedback control structure 400. In the same manner, the allocation unit 49 allocates control inputs corresponding to the time point t3 and the time point t4 from among the upper model outputs y^ that have already been received at the time point t1 to the feedback control structure 400 at the time point t3 and the time point t4. The allocation unit 49 functions in this manner and thus suitable servo control of the plant 6 can be realized even when the CPU 40 and the CPU 50 have different operation periods.

Modified Example 1 of Embodiment 2

When the CPU 40 of the servo driver 4 and the CPU 50 of the standard PLC 5 have the same operation period, the allocation unit 49 in the servo driver 4 may not be formed and the upper model output y^ corresponding to the control input u at the initial time point of the prediction interval which is calculated through model predictive control in the standard PLC 5 may be supplied to the feedback control structure 400 of the servo driver 4 as it is.

Modified Example 2 of Embodiment 2

When the CPU 50 of the standard PLC 5 is configured such that it can execute a plurality of operation processes at different operation periods, the CPU 50 of the standard PLC 5 may perform an operation process with respect to the aforementioned model predictive control in a relatively long operation period (i.e., at a relatively low speed) and perform an operation process with respect to servo command creation in a relatively short operation period (i.e., at a relatively high speed). For example, when both operation periods that are bases of the CPU 40 and the CPU 50 are Δt, the CPU 50 performs an operation process with respect to the aforementioned model predictive control in an operation period corresponding to a quadruple of Δt (4Δt=ΔT) and the CPU 40 performs an operation process with respect to feedback control in an operation period of Δt in the servo driver 4. Furthermore, the CPU 50 performs an operation process with respect to servo command creation n in the same operation period Δt as the operation period of the CPU 40 (i.e., an operation process of calculating an upper model output at a predetermined time point corresponding to an operation timing of feedback control performed by the CPU 40 through the above-described method 1 or method 2). According to this configuration, the operation load of the CPU 50 can be further mitigated. In addition, according to this configuration, it is possible to construct the control system of the present invention using a conventional servo driver (i.e., a servo driver that does not include the allocation unit 49) because the allocation unit 49 shown in FIG. 4 is not necessary. Furthermore, as compared to a case in which the control system is constructed including the servo driver 4 including the interpolation processing unit 48 illustrated in embodiment 1, there is no time delay corresponding to one command period for interpolation that is an interpolation process, and thus responsibility for the control system can be improved.

Embodiment 3

Figure 6:
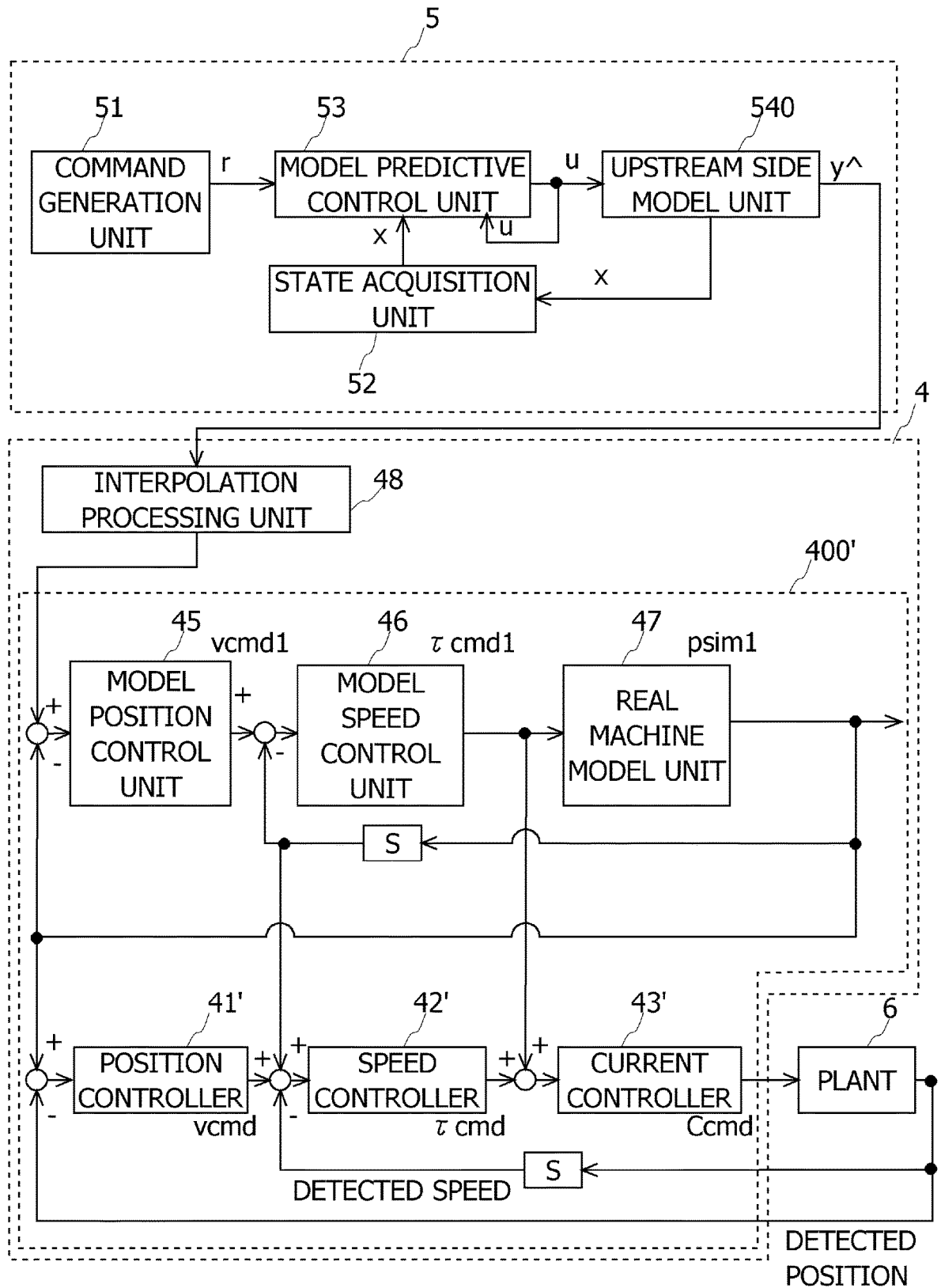
FIG. 6 is a third diagram illustrating control structures of the standard PLC and the servo driver included in the control system illustrated in FIG. 1.

Next, a third embodiment of a control system of the present invention will be described on the basis of FIG. 6. FIG. 6 is a diagram illustrating control structures with respect to the control system according to the present embodiment, and components substantially the same as those included in the control structures illustrated in FIG. 2 are denoted by the same reference numerals and detailed description thereof is omitted.

In the control system of the present embodiment, the control structure in the standard PLC 5 has the command creation unit 51, the state acquisition unit 52 and the model predictive control unit 53 the same as those in the control structure shown in FIG. 2, an upper model related to the plant 6, and an upstream side model unit 540 which simulates the output of the plant 6 using the upper model. On the other hand, the control structure of the servo driver 4 includes the interpolation processing unit 48 and a feedback control structure 400'. The feedback control structure 400' includes a position controller 41', a speed controller 42' and a current controller 43', and a model position control unit 45, a model speed control unit 46 and a real machine model unit 47 which are components modeling the controllers and the plant 6. In the present embodiment, the position controller 41' performs proportional control (P control), for example. Specifically, the position controller 41' calculates a speed command vcmd by multiplying a positional deviation that is a deviation between a model position output psim1 from the real machine model unit 47 which will be described later and a detected position by a predetermined position proportional gain.

Next, the speed controller 42' performs proportional-plus-integral control (PI control), for example. Specifically, the speed controller 42' calculates a torque command τcmd by multiplying an integration amount of a speed deviation that is a deviation between the sum of the speed command vcmd calculated by the position controller 41' and a speed output (a differential value of a model position output psim1) from the real machine model unit 47 and a detected speed by a predetermined speed integration gain and multiplying the sum of the calculation result and the speed deviation by a predetermined speed proportional gain. In addition, the speed controller 42' may perform P control instead of PI control.

The current controller 43' outputs a current command Ccmd on the basis of the torque command τcmd calculated by the speed controller 42' and the sum of a model torque command τcmd1 calculated by the model speed control unit 46 which will be described later, and the motor 2 is driven and controlled thereby. The current controller 43' includes a filter (primary lowpass filter) or a plurality of notch filters with respect to torque commands and has a cutoff frequency and the like with respect to performances of these filters as control parameters.

Next, the model position control unit 45, the model speed control unit 46 and the real machine model unit 47 will be described. In the present embodiment, the model position control unit 45 models the position controller 41' and performs P control like the position controller 41'. Specifically, the model position control unit 45 calculates a model speed command vcmd1 by multiplying a deviation between a servo command or an interpolated servo command output from the interpolation processing unit 48 and the model position output psim1 from the real machine model unit 47 by a predetermined model position proportional gain. Meanwhile, the predetermined model position proportional gain of the model position control unit 45 is set to a value equal to or less than the predetermined position proportional gain of the position controller 41' that is the modeling target.

The model speed control unit 46 models the speed controller 42' and performs PI control like the speed controller 42'. Specifically, the model speed control unit 46 calculates the model torque command τcmd1 by multiplying an integration amount of a deviation between the model speed command vcmd1 calculated by the model position control unit 45 and the speed output of the real machine model unit 47 (the differential value of the model position output psim1 from the real machine model unit 47) by a predetermined model speed integration gain and multiplying the sum of the calculation result and the deviation by a predetermined model speed proportional gain. Meanwhile, the predetermined model speed integration gain and the model speed proportional gain of the model speed control unit 46 are set to values equal to or less than the predetermined speed integration gain and the speed proportional gain of the speed controller 42' that is the modeling target. In addition, the real machine model unit 47 models the current controller 43' and the plant 6 and outputs the model position output psim1 on the basis of the model torque command τcmd1 calculated by the model speed control unit 46.

In the feedback control structure 400' configured in this manner, so-called a model follow-up control structure in which simulation of servo control of the plant 6 is performed and a result of simulation is reflected in feedback control of the plant 6 is formed by including the control structure in which the position controller 41', the speed controller 42', the current controller 43' and the plant 6 are modeled. In addition, the upper model included in the upstream side model unit 540 in the standard PLC 5 is formed such that the feedback control structure 400' for the plant 6 and model follow-up control, that is, the control structure composed of the model position control unit 45, the model speed control unit 46 and the real machine model unit 47, is reflected. Further, in the model follow-up control structure, the predetermined control gains (model position proportional gain, model speed proportional gain and model speed integration gain) set in the model position control unit 45 and the model speed control unit 46 are set to values equal to or less than the predetermined control gains (position proportional gain, speed proportional gain and speed integration gain) set in the position controller 41' and the speed controller 42' corresponding thereto. Accordingly, even when the CPU 40 and the CPU 50 have different operation periods, suitable servo control of the plant 6 can be realized. Furthermore, since followability with respect to characteristics of the modeled control structure is improved through feedback control in the servo driver 4, it is possible to maintain relatively high followability in servo control of the plant 6 according to the control system even if the accuracy of a prediction model of the model predictive control unit 53 is low to a certain degree.

In addition, there are cases in which it is not easy to create a prediction model of the model predictive control unit 53 by clearly reflecting physical characteristics and the like of the plant 6 therein according to an aspect of the plant 6. Accordingly, it is possible to maintain relatively high followability for the control system while alleviating effort necessary to create the prediction model by using, as the prediction model of the model predictive control unit, a prediction model the same as the model that models the plant 6 (hereinafter, referred to as a "follow-up control model") from among models of the real machine model unit 47.

Embodiment 4

Figure 7:
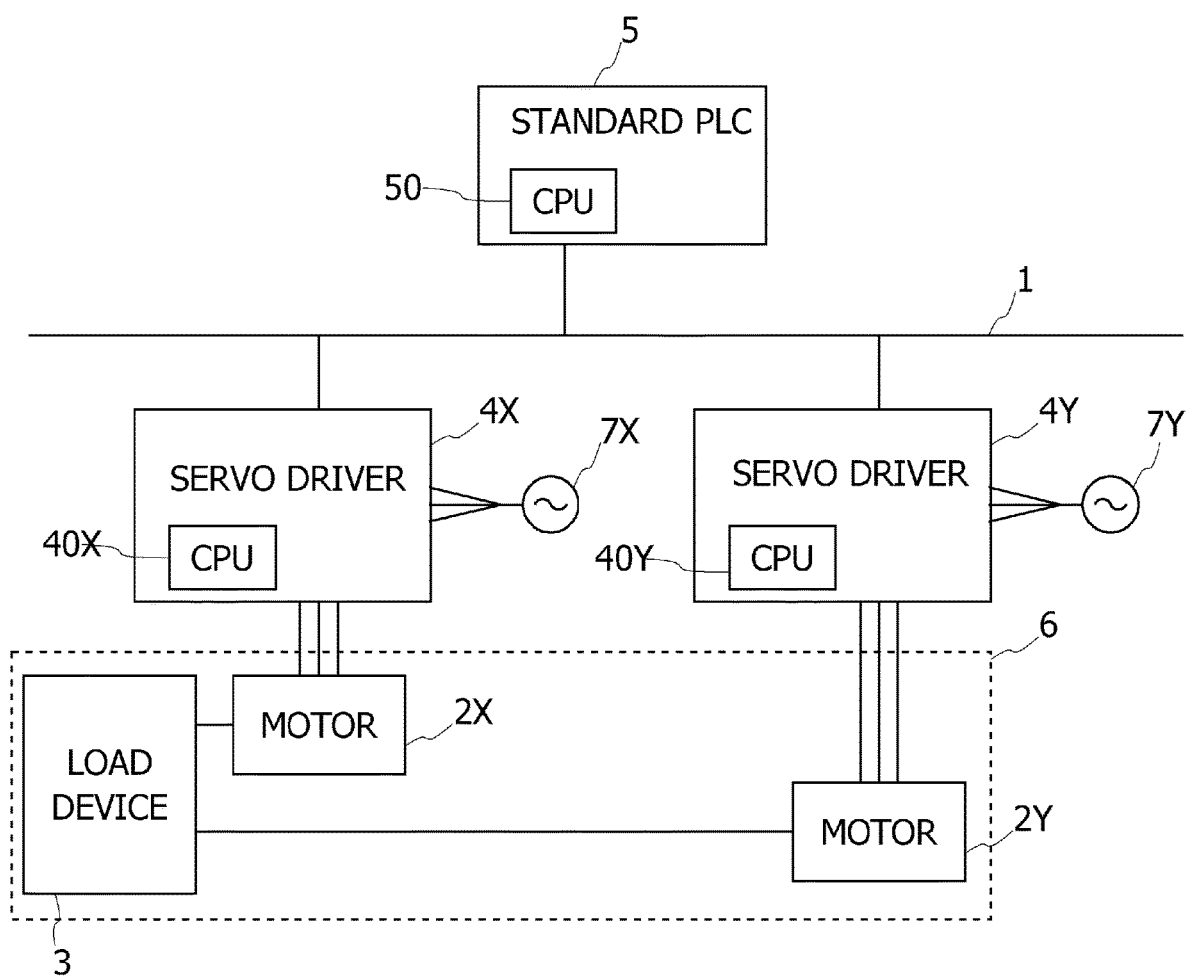
FIG. 7 is a second diagram illustrating a schematic configuration of a control system of the present invention.

Next, a fourth embodiment of a control system of the present invention will be described on the basis of FIG. 7. FIG. 7 is a diagram illustrating a schematic configuration of the control system according to the present embodiment, and components the same as those included in the control system illustrated in FIG. 1 are denoted by the same reference numerals and detailed description is omitted. In the control system of the present embodiment, the plant 6 is configured such that it is controlled and driven by two control axes. Specifically, the load device 3 is driven and controlled by motors 2X and 2Y, the former control axis is assumed to be an X axis, and the latter control axis is assumed to be a Y axis. In addition, a servo driver 4X for servo control of the motor 2X for the X axis and a servo driver 4Y for servo control of the motor 2Y for the Y axis are connected to the standard PLC 5 through the network 1. CPUs 40X and 40Y for feedback control operations respectively executed in the servo drivers 4X and 4Y are provided in the servo drivers 4X and 4Y and power supplies 7X and 7Y for driving the motors 2X and 2Y are connected to the servo drivers 4X and 4Y.

Furthermore, the command creation unit 51, the state acquisition unit 52, the model predictive control unit 53, and the upstream side model unit 54 having an upper model corresponding to each control axis, illustrated in FIG. 6, are formed such that operations with respect to model predictive control of the X axis and the Y axis can be executed in the standard PLC 5, and the interpolation processing unit 48 and the feedback control structure 400' in which model follow-up control is executable, illustrated in FIG. 6, are formed in each of the servo drivers 4X and 4Y. Here, a follow-up control model in the feedback control structure 400' of the servo driver 4X is determined corresponding to a configuration with respect to the control axis X including the motor 2X and a follow-up control model in the feedback control structure 400' of the servo driver 4Y is determined corresponding to a configuration with respect to the control axis Y including the motor 2Y.

In addition, in the servo drivers 4X and 4Y, predetermined control gains (a model position proportional gain, a model speed proportional gain and a model speed integration gain) set in the model position control unit 45 and the model speed control unit 46 are set to values equal to or less than predetermined control gains (a position proportional gain, a speed proportional gain, and a speed integration gain) set in the position controller 41' and the speed controller 42' corresponding thereto. Further, in the servo driver 4X and the servo driver 4Y, the predetermined control gains in the model position control unit 45 and the model speed control unit 46 are set to the same values in the control axes. By constructing the control system in this manner, it is possible to provide followabilities of the same degree for commands in the X axis and the Y axis and thus promote improvement of followability of the entire plant 6.

Embodiment 5

Figure 8:
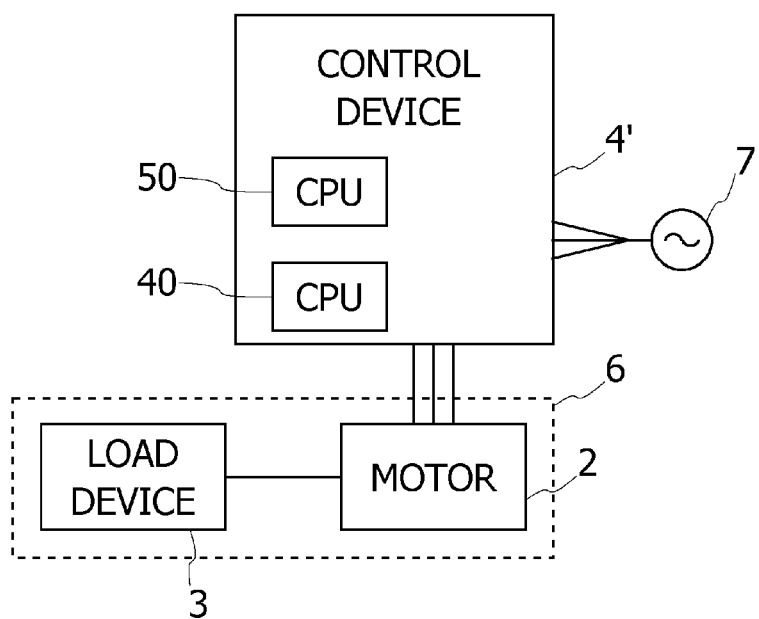
FIG. 8 is a third diagram illustrating a schematic configuration of a control system of the present invention.

Next, a fifth embodiment of a control system of the present invention will be described on the basis of FIG. 8. FIG. 8 is a diagram illustrating a schematic configuration of the control system according to the present embodiment, and components the same as those included in the control system illustrated in FIG. 1 are denoted by the same reference numerals and detailed description is omitted. In the control system of the present embodiment, components corresponding to the standard PLC 5 and the servo driver 4 illustrated in FIG. 1 are mounted in an identical housing shared therebetween and formed as a single control device 4'. The CPU 50 for executing operations with respect to the above-described model predictive control and the CPU 40 for executing operations with respect to feedback control are included in the control device 4' and the control structure with respect to model predictive control and the control structure with respect to feedback control, illustrated in FIG. 6, are formed therein. In the control system configured in this manner, the interpolation processing unit 48 can also be formed and suitable servo control of the plant 6 can be realized in consideration of a difference between the operation periods of the CPU 40 and the CPU 50.

REFERENCE SIGNS LIST

1 Network
2 Motor
3 Load device
4 Servo driver
4' Control apparatus
5 Standard PLC
6 Plant
40 CPU
50 CPU

The invention claimed is:

1. A control system for causing an output of a predetermined control target that is a servo control target to follow a predetermined command, comprising:
a first processing device comprising a first processor and a prediction model that defines a correlation between a predetermined state variable with respect to the predetermined control target and a control input to the predetermined control target comprising a predetermined state equation, the first processing device performing model predictive control on the basis of the prediction model according to a predetermined evaluation function in a prediction interval having a predetermined duration using the first processor and outputting a servo command corresponding to the control input at at least an initial time point of the prediction interval; and
a second processing device comprising a second processor different from the first processor and a predetermined feedback system including one or a plurality of controllers to which a feedback signal related to an operation of the predetermined control target is input, and receiving the servo command output from the first processing device, the second processing device performing feedback control according to the predetermined feedback system on the basis of the received servo command using the second processor, wherein
the second processing device further comprises a second processing side control model unit including a control model which models the predetermined feedback system and the predetermined control target,
the first processing device includes an upper model corresponding to the control model included in the second processing side control model unit and creates the servo command on the basis of the control input using the upper model, and the second processing device performs model follow-up control as the feedback control according to the control model included in the second processing side control model unit using the second processor.

2. The control system according to claim 1, wherein
the first processor executes the model predictive control in a first operation period,
the second processor executes the feedback control in a second operation period shorter than the first operation period,
the first processing device creates the servo command corresponding to the control input at the initial time point of the prediction interval on the basis of an operation result of the model predictive control executed in the first operation period and outputs the servo command to the second processing device, and
the second processing device creates an interpolated servo command according to a difference between the first operation period and the second operation period on the basis of the servo command from the first processing device and performs the feedback control using the second processor on the basis of the servo command and the interpolated servo command in the second operation period.

3. The control system according to claim 1, wherein
the first processor executes the model predictive control in a first operation period,
the second processor executes the feedback control in a second operation period shorter than the first operation period,
the first processing device creates, using the first processor, a plurality of servo commands at a plurality of time points including the initial time point and corresponding to the second operation period in a predetermined interval including the initial time point of the prediction interval and corresponding to the first operation period on the basis of an operation result of the model predictive control executed in the first operation period in the first operation period and outputs the plurality of servo commands to the second processing device, and
the second processing device performs the feedback control using the second processor on the basis of the plurality of servo commands in the second operation period according to time sequences associated with the plurality of servo commands.

4. The control system according to claim 1, wherein
the first processor is configured to execute a plurality of operation processes in different operation periods and executes the model predictive control in a first operation period,
the second processor executes the feedback control in a second operation period shorter than the first operation period,
the first processing device creates the servo command corresponding to the control input at a predetermined time corresponding to the same operation period for creation as the second operation period in a predetermined interval including the initial time point of the prediction interval and corresponding to the first operation period on the basis of an operation result of the model predictive control executed in the first operation period using the first processor in the operation period for creation and outputs the servo command to the second processing device, and
the second processing device performs the feedback control using the second processor on the basis of the servo command in the second operation period.

5. The control system according to claim 1, wherein the prediction model is the same control model as the control model provided in the second processing side control model unit.

6. The control system according to claim 5, wherein
predetermined model follow-up control gains in the model follow-up control according to the control model included in the second processing side control model unit are equal to or less than predetermined feedback control gains of the controllers included in the predetermined feedback system.

7. The control system according to claim 6, wherein
the predetermined control target includes a plurality of control axes,
the prediction model corresponds to each of the plurality of control axes and is defined by the predetermined state equation,
the predetermined feedback system is associated with each of the plurality of control axes,
the control model included in the second processing side control model unit is associated with each of the plurality of control axes, and
the plurality of predetermined model follow-up control gains in the second processing side control models associated with the plurality of control axes are set to a command value in the plurality of control axes.

8. The control system according to claim 1, wherein
the first processing device and the second processing device are mounted in an identical housing shared therebetween.

* * * * *